(12) United States Patent
Pulvirenti (10) Patent No.: US 7,059,107 B2
(45) Date of Patent: Jun. 13, 2006

(54) MULTI-PURPOSE LAWN ASSEMBLY

(75) Inventor: Vincent Pulvirenti, 2297 Saratoga La., West Palm Beach, FL (US) 33409

(73) Assignee: Vincent Pulvirenti, West Palm Beach, FL (US)

( * ) Notice: Subject to any disclaimer, the term of this patent is extended or adjusted under 35 U.S.C. 154(b) by 37 days.

(21) Appl. No.: 10/910,438

(22) Filed: Aug. 3, 2004

(65) Prior Publication Data

US 2005/0126798 A1    Jun. 16, 2005

Related U.S. Application Data

(60) Provisional application No. 60/528,370, filed on Dec. 10, 2003.

(51) Int. Cl.
*A01D 34/03* (2006.01)
*E01H 8/00* (2006.01)

(52) U.S. Cl. .............................. 56/13.7; 172/13; 172/16

(58) Field of Classification Search ................. 56/13.7, 56/16.9; 172/13, 14, 15, 16, 17
See application file for complete search history.

(56) References Cited

U.S. PATENT DOCUMENTS

| | | | | | |
|---|---|---|---|---|---|
| 3,188,788 | A | * | 6/1965 | Legge | ........................ 56/13.7 |
| 3,489,225 | A | * | 1/1970 | Bass | ............................ 172/15 |
| 3,753,339 | A | * | 8/1973 | Loughead | ..................... 56/119 |
| 3,812,917 | A | | 5/1974 | Strate | |
| 3,812,918 | A | * | 5/1974 | Beck | ............................ 172/19 |
| 3,852,944 | A | * | 12/1974 | Zuercher | ..................... 56/12.2 |
| 4,046,200 | A | * | 9/1977 | Mullet et al. | .................. 172/14 |
| 4,200,155 | A | | 4/1980 | Mullet et al. | |
| 4,318,267 | A | * | 3/1982 | Green | ........................ 56/13.7 |
| 4,355,497 | A | | 10/1982 | Murphy | |
| 4,691,784 | A | | 9/1987 | Mullet et al. | |
| 4,718,221 | A | * | 1/1988 | Wessel et al. | ................. 56/16.9 |
| 4,852,260 | A | * | 8/1989 | Federico et al. | ............... 30/292 |
| 4,930,580 | A | | 6/1990 | Fuss et al. | |
| 5,167,108 | A | | 12/1992 | Bird | |
| 5,170,848 | A | * | 12/1992 | Walton | ......................... 172/19 |
| D360,639 | S | | 7/1995 | Strother | |
| 5,598,689 | A | | 2/1997 | Bork | |
| 5,694,752 | A | | 12/1997 | Warfield, III | |
| 6,032,443 | A | | 3/2000 | Aldrich | |
| 6,213,218 | B1 | * | 4/2001 | Miller | ......................... 172/19 |
| 6,223,510 | B1 | | 5/2001 | Gillins et al. | |
| 6,301,863 | B1 | | 10/2001 | Liebrecht | |
| 6,343,461 | B1 | | 2/2002 | Knott | |
| 6,415,586 | B1 | | 7/2002 | Park | |
| 6,430,906 | B1 | | 8/2002 | Eddy | |
| 6,457,301 | B1 | | 10/2002 | Buss | |
| 6,474,053 | B1 | | 11/2002 | Lund | |
| 2002/0100266 | A1 | | 8/2002 | Greenwell | |

* cited by examiner

*Primary Examiner*—Thomas A Beach
(74) *Attorney, Agent, or Firm*—Akerman Senterfitt; J. Rodman Steele, Jr.; Michael K. Dixon (57) ABSTRACT

An edger assembly for use with a mechanized vehicle includes a mechanized vehicle, laterally adjustable shafts extending laterally outwardly on both sides of the vehicle, and dual elongated arms attached at each end of the shafts each generally perpendicular to the shafts. The edger assembly also includes an edging assembly attached to each arm wherein the edging assembly has a blade. Further, the edger assembly includes a protecting arm connected to the edger and slidably positioned to engage an object prior to blade contact and a mechanical linkage. The mechanical linkage can be constructed and arranged to move in response to protecting arm movement, where movement of the mechanical linkage moves the blade from an edging position to a non-edging position.

20 Claims, 5 Drawing Sheets

MULTI-PURPOSE LAWN ASSEMBLY

CROSS REFERENCE TO RELATED APPLICATIONS

This application claims priority to U.S. Provisional Application Ser. No. 60/528,370 filed Dec. 10, 2003, the entirety of which is herein incorporated by reference.

FIELD OF INVENTION

The present invention relates to tractor attachments which are particularly suited for golf courses, divided roadways with grass islands, and gated communities having vast areas of access paths surrounded by grass areas and for islands of grass surrounded by grassless surfaces which need periodic edging to create a manicured appearance.

BACKGROUND OF THE INVENTION

Typically, edging is done with a hand-held mechanized edging device, although there are devices in the prior art directed at mechanized edgers for use with tractors. Usually, at the completion of the edging operation, a worker will retrace his steps with a blower to remove grass clippings from the path, particularly from paved areas.

Although such an operation creates the desired appearance, it is labor intensive, particularly where significant areas of paths are utilized, such as in recreation areas, including golf courses. Additionally, the labor intensiveness causes a correlated increase in costs.

Additionally, edging grass areas commonly includes the use of blades or other cutting members rotating at high velocity. Although, such an arrangement is quite effective for cutting grasses and other shrubs, the user must carefully examine the path to be cut for any hard objects that might damage a rotating blade or for any structures that the blade might damage. In particular, the user must be careful when edging near concrete sidewalks that can be damaged by the blade.

Figure 1:
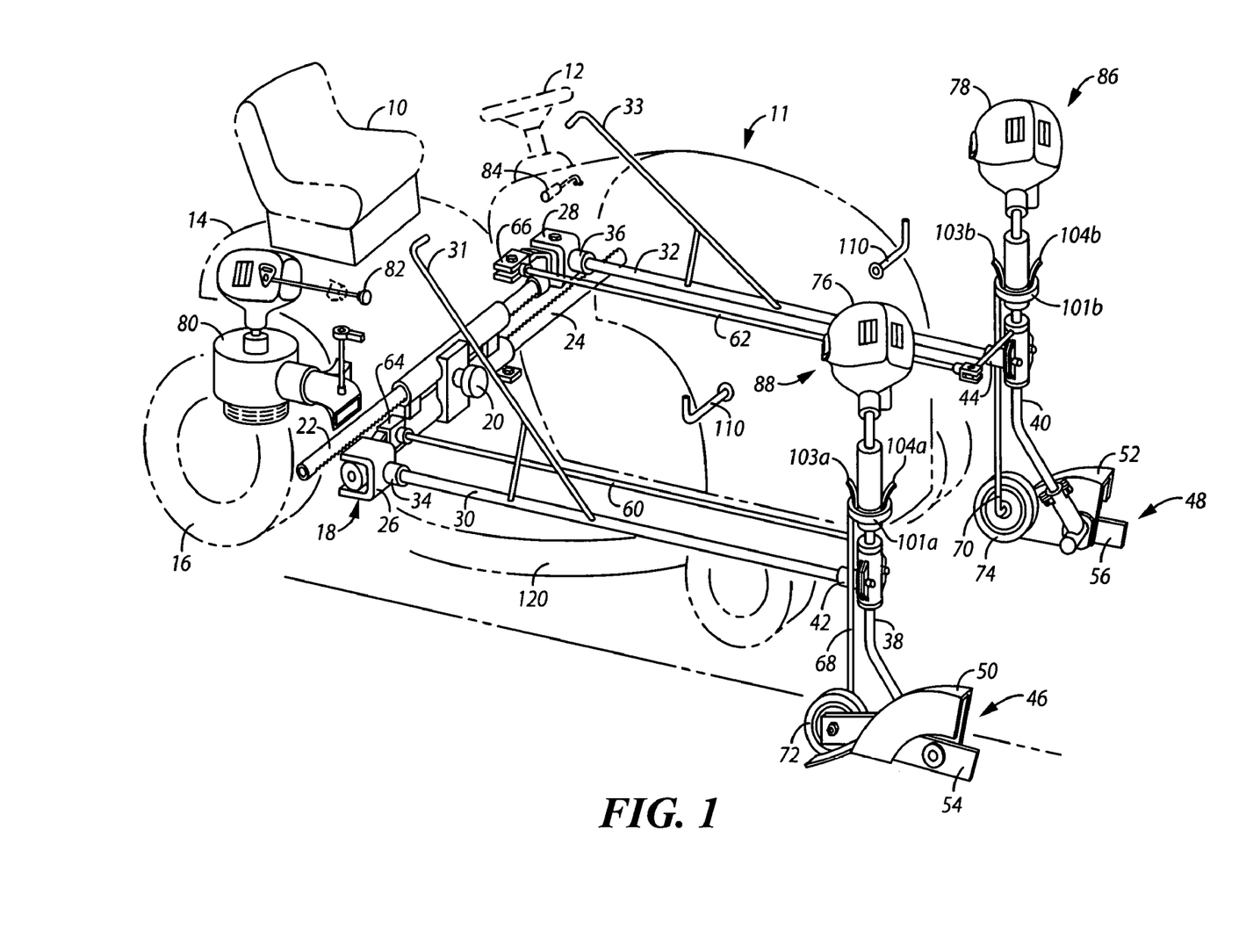
FIG. 1 is an isometric view of a multi-purpose lawn device.
Figure 2:
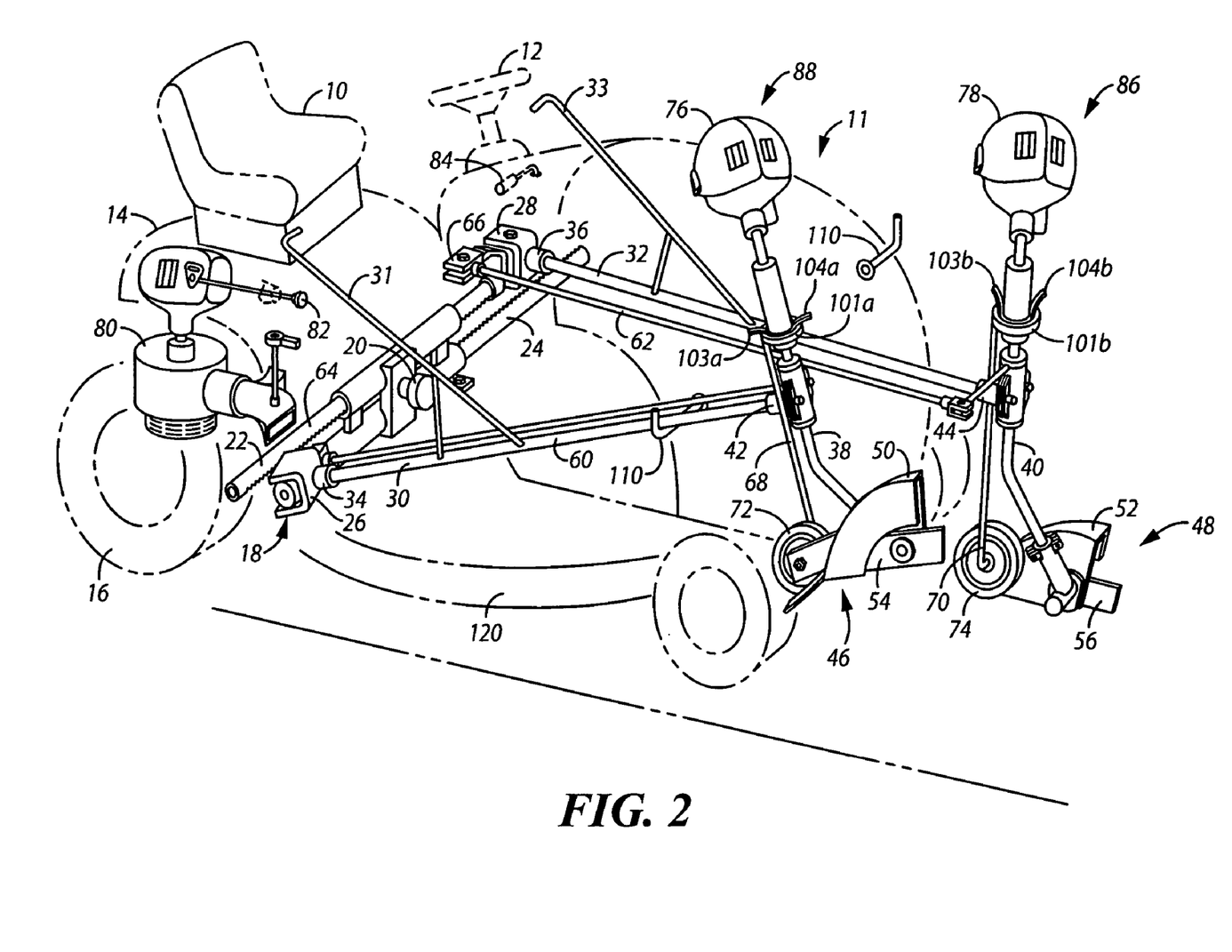
FIG. 2 is a view of an alternative arrangement of the multipurpose lawn device shown in FIG. 1.

A number of patents disclose the use of edgers mounted on tractors. U.S. Pat. No. 4,200,155 discloses a lawn edger attachment which, as seen in FIGS. 1 and 2, is mounted to a tractor device.

U.S. Patent Publication 2002-0100266 discloses a mobile power driven vegetation trimmer utilizing a nylon wire and having line feed control.

U.S. Pat. No. 6,474,053 discloses a lawn mower equipped with a retractable edger and trimmer.

U.S. Pat. No. 6,415,586 discloses a yard trimming system for attachment to a vehicle.

Although the noted references provide mechanized trimming systems to replace hand use, none of the disclosures are particularly adaptable for extremely large areas with multiple paths or for large islands of grass surrounded by non-grass surfaces. In particular, none of the systems disclosed can reduce the cutting trips to a single trip wherein all cutting, as well as clean-up, can occur within a single trip. Further, none of the references incorporate any structure for detecting hard objects and preventing damage to the cutting member.

Furthermore, none of the references disclose the use of a bilateral edging device that can be adjustable, where edging occurs simultaneously on both sides of the path or pavement. Supports for storing the edging devices in a rest position are also not disclosed. Further, none of the references disclose the combination of bilateral edging devices with a grass cutter, suction device, and/or blower attachment to remove the grass clippings from the path or pavement as the vehicle progresses.

SUMMARY OF THE INVENTION

Accordingly, it is an object of the subject invention to provide an edging assembly in which a path or pavement can be edged on both sides simultaneously to eliminate the need for two trips, with first one side of the pavement, and then the second side being edged. To that end, it is also an objective to provide an edging assembly that can be adjusted to adapt to paths of various widths.

It is another object of the subject invention to significantly reduce the time of edging by hand or with a vehicle that requires multiple trips along a path or sidewalk.

Further, it is an object of the subject invention to realize substantial time savings and labor costs, as well as savings in fuel, by the use of a system which has been developed to improve the efficiency of edging operations.

It is still another object of the subject invention to provide an attachment to a mechanized vehicle which can facilitate clean-up after the edging process.

It is still another object of the subject invention to develop a comprehensive system for edging and clean-up combined, wherein all aspects of the edging process can be done in one trip.

In one aspect of the invention, an edger assembly for use with a mechanized vehicle is provided. The edger assembly can include a mechanized vehicle, laterally adjustable shafts extending laterally outwardly on both sides of the vehicle and dual elongated arms attached at each end of the shafts each generally perpendicular to the shafts. An edging assembly can be attached to each arm. The edger assembly can also include a blade protecting assembly having a protecting arm connected to the edger and slidably positioned to engage a concrete structure prior to blade contact. The blade protecting assembly can also include a mechanical linkage constructed and arranged to move in response to protecting arm movement, wherein movement of the mechanical linkage moves the blade from an edging position to a non-edging position.

In one arrangement, the elongated arms can be adjusted through the use of a turn nob. Also, the laterally adjustable shafts include ratcheted adjustment structure. Further, the laterally adjustable shafts and the dual elongated arms can form a parallelogram permitting independent change of direction during movement of the vehicle. The lawn edger assembly can also include a support member arranged and placed on the vehicle to support an edger assembly at rest position. Also, a clippings blower can be provided.

In another arrangement, the mechanical linkage includes a biased link which forces rapid movement of the mechanical linkage. The length of the biased link can be greater than the length of the other links of the mechanical linkage.

Additionally, the protecting arm can be coupled to a spring and slidably movable in a cylindrical housing.

In another aspect of the invention, a method of edging lawn edges along pavement is provided. The method can include the steps of edging one side of a pavement with a lawn edger driven by a mechanized vehicle and simultaneously edging the second side of a pavement with a second lawn edger driven by the mechanized vehicle.

BRIEF DESCRIPTION OF THE DRAWINGS

There are presently shown in the drawings embodiments which are presently preferred, it being understood, however, that the invention is not limited to the precise arrangements and instrumentalities shown.

FIG. 4 is bottom view of the blade protection assembly of FIG. 3a.

DETAILED DESCRIPTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of". Further, the phrase "including at least one selected from the group consisting of a clippings blower and a suction device" includes a clippings blower, a suction device, or a combination thereof.

The present invention provides a device for maintaining well manicured lawn areas. More specifically, the multipurpose lawn device provides the ability to edge two grass lines simultaneously, which can reduce edging time and can provide uniform edging lines. Additionally, the multipurpose lawn device is adjustable during use so that a user can operate both edging assemblies simultaneously from a seated position on the device. To that end, the user can selectively engage and disengage one or both edgers, such as may be necessary while crossing a concrete area or where only one edging line is desired. Still further, the multipurpose lawn device provides a protection assembly for ensuring that the concrete structures, such as sidewalks, are not damaged by the blade of the edgers.

With respect to FIG. 1, a mechanized vehicle, such as tractor 11, is disclosed with standard elements, including the seat 10, a steering wheel 12, riser 14, and wheels 16. The invention is not limited to a particular type and/or design of tractor 11 as the tractor 11 can include any of a number of varieties manufactured and available for use for yard care.

The preferred embodiment of the subject invention, as will be discussed herein, is a dual mounted lawn edging device, generally shown as 18. The structural frame of the dual mounted edging mechanism 18 comprises rack and pinion connectors, including left and right ratchet shafts 22 and 24. The lock knob 20 can lock the lateral extension of the shafts 22 and 24 to set the positioning of the edgers outwardly from the tractor 11. Accordingly, the shafts 22 and 24 can be extended and retracted to adjust the positioning of edgers.

The outward joints 26, 28 of each of the ratchet shafts 22, 24 provide the transfer extension to cutter arms 30 and 32 extending through junctions 34 and 36. The cutter arms 30 and 32 meet edger assemblies 86 and 88 in junction receivers 42 and 44. Attached to the vertical members 38 and 40 are the cutters 46 and 48. The edging cutter blades 56 and 54 are housed within cutting housing members 50 and 52 that also function as cutting guards.

Extending outwardly from right and left ratchet arms 22, 24 are also arms 60 and 62. Junction boxes 64 and 66 provide the connector to the ratchet members 22, 24. Vertical members 68 and 70 connect to wheels 72 and 74, which provide the stability for the cutters 46 and 48. Further, the parallelogram provided by the respective linkage of arms 60 and 62 with the cutter arms 30 and 32 allows the edger assembly cutting direction to be adjusted during use by user seated at seat 10. Accordingly, the cutters 46 and 48 can easily be adjusted to align with the direction of movement of the tractor 11 along non linear paths and even around turns.

Furthermore, engagement of the wheels 72 and 74 with the ground causes the vertical members 68 and 70 to displace upwards. In turn, the engagement sheaths 101a and 101b can be forced over the operation levers 103a and 103b and the speed levers 104a and 104b. Accordingly, the displacement of the vertical members 68 and 70 can cause the sheaths 101a and 101b to begin operation and control the speed of cutters 46 and 48. Additionally, such a mode of operation can provide a safety mechanism whereby the cutter cannot operate when the wheels 72 and 74 are not engaged. Additionally, the mechanism shown as 76, 78 provides the cutters 46 and 48 with piston-like forces with the pressure being sufficient to rotate the blades 54 and 56 and to allow the cutters 46 and 48 to travel lightly over the ground, raising and lowering as desired.

A blower or suction device 80 with control 82 is shown with air directed outwardly and backwardly from the vehicle as it moves forward. Nevertheless, the invention is not limited in this regard as the blower can be arranged to provide concentrated air flow in any desired direction and at any desired angle. Alternatively, the suction device 80 can be orientate to collect clippings as they are produced. An accelerator is shown schematically as 84 and pedals (not shown) enable the vehicle to be operated in standard fashion.

The tractor 11 can include a grass cutting device 120. The grass cutting device 120 is shown as having a round housing. As would be appreciated by one skilled in the art, the grass cutting device 120 can leave the cut grass on the ground or can be coupled with a grass clipping mechanism to collect the cut grass as the tractor progresses. In combination with the cutters 46 and 48, the tractor 11 with a grass cutting device 120 provides a comprehensive lawn care product where multiple trips are rendered unnecessary.

By using the edging device of the subject invention, the tractor 11 can be utilized with the edger assemblies 86 and 88 on long driveways or golf cart paths where a relatively uniform pavement is found. By driving along the pavement, the user of the equipment can maintain the transverse distances necessary to follow and edge the pavement on both sides of the device. If an abrupt end or irregular surface is encountered, the driver can raise the cutter by pulling on driver arms 31 and 33. The respective cutter arm 30, 32 can then be raised temporarily while the vehicle continues along the predetermined pathway.

In another arrangement illustrated in FIG. 2, the tractor 11 can be provided with support members 110. The support members 110 can be used to support the edger assemblies 86 and 88 when use is not desired. For instance, the support members can be used to hold a cutter 46 and 48 when the surface to edge only needs one side to be edged. Further, supports 110 can be used to hold both edger assemblies 86 and 88 when the tractor 11 intermittently rides over concrete surfaces that may damage the cutters if they remain in the cutting position. The driver arms 31 and 33 can be engaged by the operator to raise the cutter arms 30 and 32 and move the cutter arms 30 and 32 to the support members 110. Accordingly, the cutters 46 and 48 can be moved by the operator into a cutting and/or resting position during operation of the tractor 11 without the operator moving from seat 10. Additionally, it should be noted that with the edger assemblies 86 and 88 in a rest position on the support members 110, the wheels 72 and 74 will not be engaging the ground, and the sheath 101*a* and 101*b* can release the levers 103*a*, 103*b*, 104*a*, and 104*b*, and the cutters 46 and 48 will cease operating.

Figure 3A:
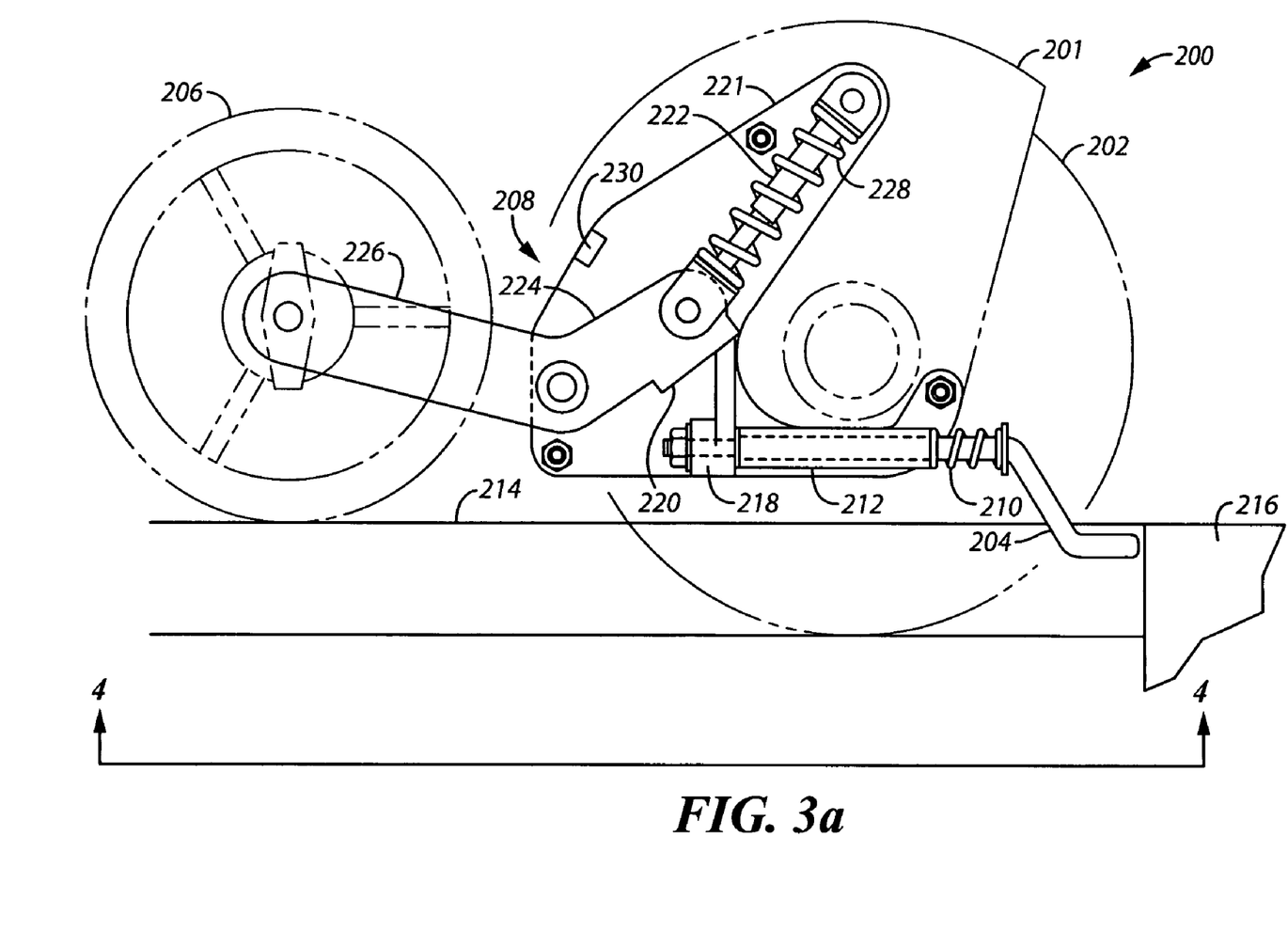
FIG. 3a is a perspective view of a blade protection assembly in a edging position.
Figure 3B:
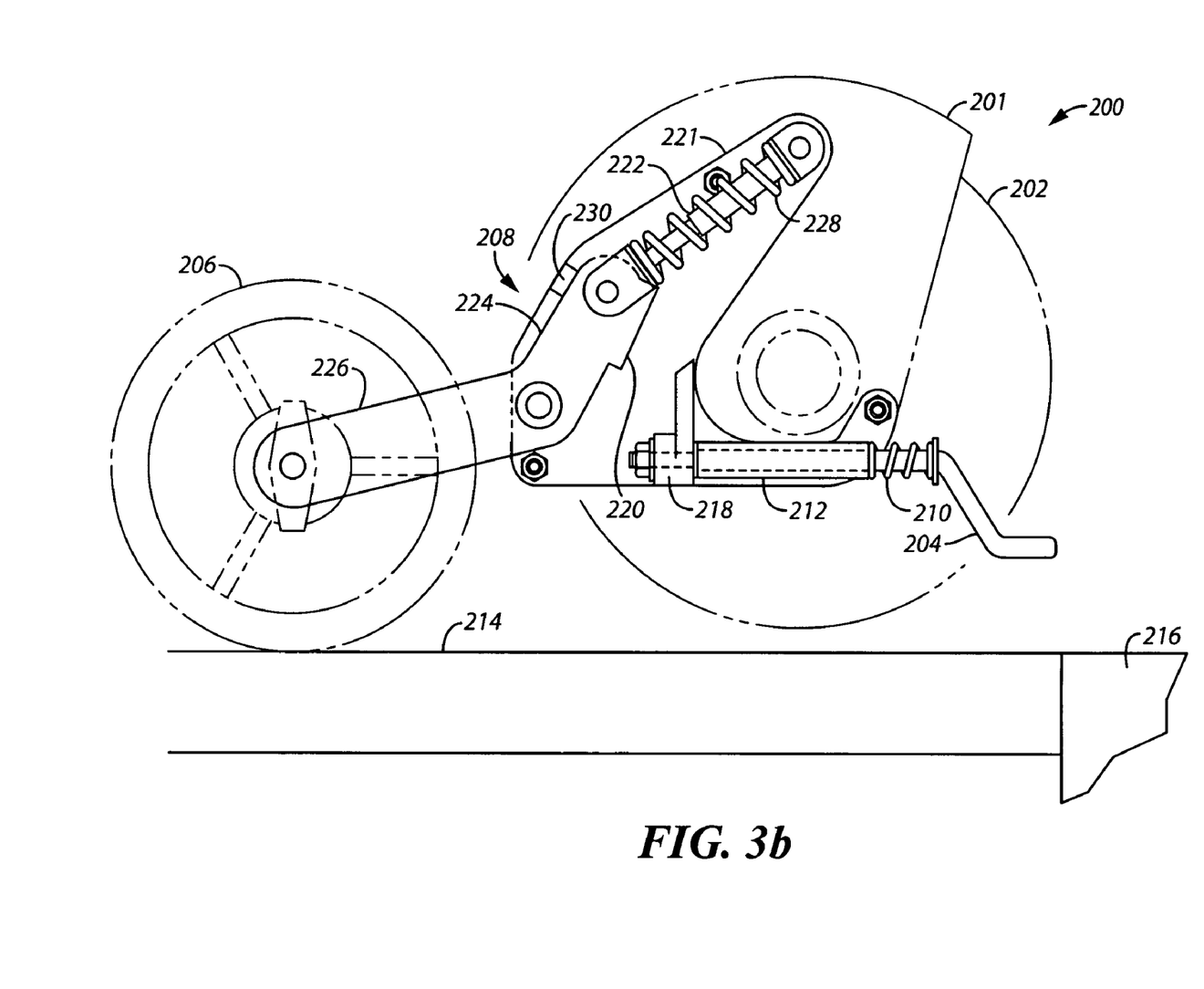
FIG. 3b is a perspective view of the protection assembly of FIG. 3a in a non-edging position.

FIGS. 3*a*, 3*b*, and 3*c* illustrate an embodiment of a protection assembly 200 for ensuring that concrete structures are avoided during edging. The protection assembly 200 can be incorporated with the tractor discussed above and can also be incorporated with hand-held edgers. Additionally, the protection assembly 200 can be located within and connected to a cutting housing member 201. The blade 202 can be included with the edger or can be provide with the assembly 200, which may include a protecting arm 204 attached to wheel 206 via movable mechanical linkage 208. The mechanical linkage 208 is constructed and arranged to move the blade 202 from the cutting path to prevent damage from hard objects. A plate 221, having the components of assembly 200, can be attached to a housing member 201, and therefore, the assembly 200 can be fitted to and supplement current edgers.

FIG. 3*a* illustrates the protection assembly 200 in an edging configuration with the blade 202 in the edging path 214. The protecting arm 204 protrudes beyond the circumference traced by rotating blade 202 to engage any hard objects 216 before the rotating blade 202 can strike the object 216. The distance the protecting arm 204 protrudes and the depth at which it is set can be varied. The protecting arm 204 can be coupled to a spring 210, slidably mounted in a cylindrical housing 212, and coupled to transfer arm 218. Also, it should be noted that because the protecting arm 204 is coupled to spring 210, the protecting arm 204 will be forced to extend to its operating position. Further, the spring 210 provides for protecting arm 204 to have slight movement or play prior to moving the blade 202 out of the cutting path. Thus, some objects, such as dense grass floras, may slightly move the protecting arm 204 without causing the blade 202 to be disengaged from the cutting position.

Figure 4:
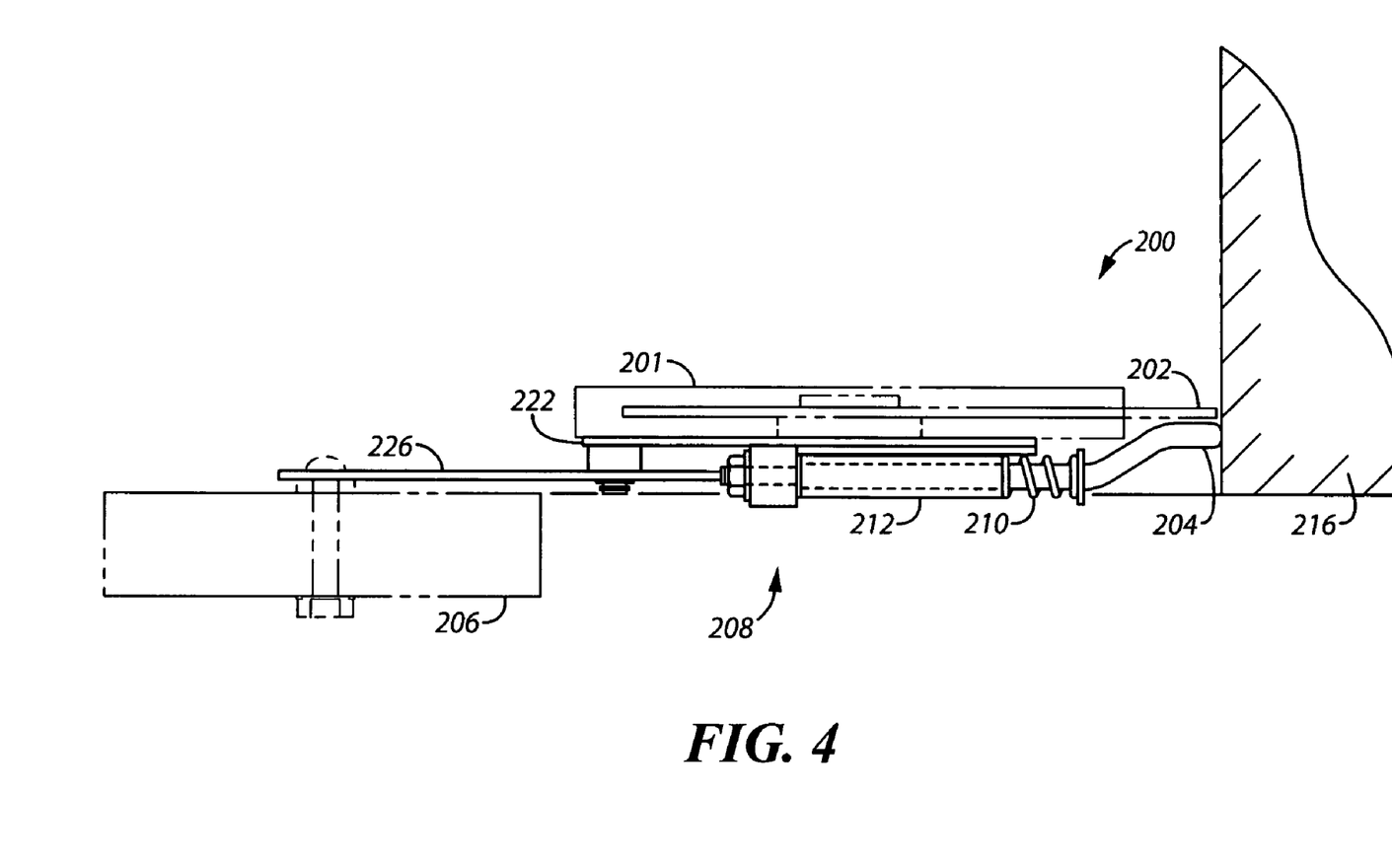

A bottom view of the protection assembly 200 is shown in FIG. 4. As illustrated, the protection assembly 200 is offset from the blade 202 so that the protection assembly 200 can move and function without any interference with blade 202.

Movement of the protecting arm 204 along housing 212 causes the transfer arm 218 to slide along surface 220 of the mechanical linkage 208, which in turn, causes the blade 202 to move to a non-edging position. The mechanical linkage 208 includes a biased link 222 hingably coupled to a transfer link 224, which is hingably coupled to a wheel link 226. The biased link 222 can be biased with any biased material, or can include a spring 228 to provide a biasing force.

In such an arrangement, the transfer arm 218 slides against and moves the transfer link 224. This movement, in turn, forces movement of the biased link 222 to move from an edging position (see FIG. 3*a*) to a non-edging position (see FIG. 3*b*). During the movement, the spring 228 is slightly compressed and then extends again as the biased link 222 is moved to the non-edging position. The spring 228 forces a quick movement of the biased link 222 to the non-edging position. A stop 230 is provided to restrict the range of movement of the biased link 222.

Additionally, movement of the biased link 222 causes a reaction in the mechanical linkage 208. The movement of the biased link 222 forces the transfer link 224 to correspondingly adjust, which in turn forces the wheel link 226 to adjust its position. With the movement of the wheel link 226, the wheel 232 is forced into the ground and the blade 202 is moved out of the edging path 214. It should be noted that the links of the mechanical linkage 208 begin to move when the protecting arm 204 engages a concrete structure. Thus, the blade 202 begins its movement from the edging path 214 when the protecting arm 204 is moved.

Further, the length of the biased link 222 can be greater than the length of the transfer link 224. In such an arrangement, as the biased link 222 moves through its range of motion, the transfer link 224 and the wheel link 226 moves a greater distance in the same time period, resulting in a rapid transfer of the mechanical linkage 208 from the edging position in FIG. 3*a* to the non-edging position shown in FIG. 3*b*. The greater the ratio of biased link 222 length to transfer link 224 length, the more rapid the movement.

In operation, the protection assembly protects the blade 202 from damage. During edging, the protection arm 204 protrudes in the edging path 214 extended beyond the circumference traced by the blade 202. When a hard object 216 is encountered, the protecting arm 204 is forced to slide in housing 212 and transfer arm 218 pushes against surface 220, which causes movement of the mechanical linkage 208. Movement of the biased link 222 provides for the rapid transformation of the mechanical linkage 208 to force the wheel downward into the ground and move the blade 202 from the edging position.

To return the blade 202 to the cutting position, the user can simply apply force from the vertical member (not shown) to which the blade 202 and protection assembly 200 are connected. In a hand-held arrangement, the user's weight can be used to force the blade 202 to the edging position. In an arrangement such as the one shown in FIG. 1, the user can manipulate driver arms 31 and 33 to return the blade 202 to the edging position.

When the mechanized vehicle with edger assemblies is used, it will be appreciated that with dual cutting capability, lawn edging can be accomplished in substantial less time that it takes to go along each side of the sidewalk, either by hand or tractor to perform the edging.

It will be appreciated that through the use of blower 80, cuttings which would otherwise remain on the sidewalk can be blown away as part of the cutting operation. Further, a suction device (not shown) can also be incorporated for removing cuttings and debris.

It will be appreciated that many forms of edgers may be used as long as dual edgers can be positioned on the mechanized device, usually a tractor. The time savings can be substantially reduced from the typical edging arrangement, as one cutting trip can be substituted for the two trips that were typically required in the past.

It will be appreciated that the present invention may be adapted for utilization beyond the specific environments discussed herein. Accordingly, the present invention is not limited to the specific embodiments described herein, but is defined by the scope and spirit of the following claims.

What is claimed is:

1. A multi-purpose lawn cutting assembly, comprising:
    a mechanized vehicle;
    a first edging assembly extending from the vehicle, comprising,
        a first shaft extending laterally from a first frontside of the vehicle;
        a first elongated arm coupled to an end of the first shaft opposite to the vehicle;
        at least one first wheel coupled to the first elongated arm in a position capable of contacting a ground surface; and
        a first blade rotatably coupled to the first elongated arm proximate to the at lease one first wheel;
    a second edging assembly extending from the vehicle, comprising,
        a second shaft extending laterally from a second frontside of the vehicle that is generally opposite from the first front side;
        a second elongated arm coupled to an end of the second shaft opposite to the vehicle;
        at least one second wheel coupled to the second elongated arm in a position capable of contacting a ground surface; and
        a second blade rotatably coupled to the second elongated arm proximate to the at least one second wheel; and
    a protection assembly extending beyond the first blade in the first edging assembly to contact an object before the first blade makes contact with the object, wherein the protection assembly comprises a protecting arm slidably attached to a cutting blade housing member surrounding the first blade, a transfer link extending between the cutting blade housing member and the first wheel, and a biased link attached to an end of the transfer link and attached to the cutting blade housing member such that as the protecting arm slides generally along its longitudinal axis when contacting the object, the protecting arm contacts the transfer link and causes the transfer link to rotate the first blade and cutting blade housing member about the first blade such that the first blade is out of contact with the ground surface.

2. The lawn cutting assembly of claim 1, wherein the first and second shafts are movably attached to the vehicle.

3. The lawn cutting assembly of claim 1, further comprising a blower configured to blow gases toward the first edging assembly to blow debris from a surface proximate to the assembly.

4. The lawn cutting assembly of claim 1, further comprising a suction device configured to blow gases toward the first edging assembly to blow debris from a surface proximate to the assembly.

5. The lawn cutting assembly of claim 1, wherein the first and second edging assemblies are adjustable independently of the other.

6. The lawn cutting assembly of claim 1, wherein the first and second edging assemblies are laterally adjustable and form a parallelogram permitting independent change of direction of the first and second edging assemblies during movement of the vehicle.

7. The lawn cutting assembly of claim 1, wherein the biased link forces rapid movement of the mechanical linkage.

8. The lawn cutting assembly of claim 7, wherein the biased link is greater in length than the transfer link.

9. The lawn cutting assembly of claim 8, further comprising a spring positioned concentrically on the protecting arm and within a cylindrical housing.

10. A lawn cutting assembly, comprising:
    a mechanized vehicle;
    a first edging assembly extending from the vehicle, comprising,
        a first shaft extending laterally from a first frontside of the vehicle; a first elongated arm coupled to an end of the first shaft opposite to the vehicle;
        at least one first wheel coupled to the first elongated arm in a position capable of contacting a ground surface; and
    a first blade rotatably coupled to the first elongated arm proximate to the at least one first wheel;
        a second edging assembly extending from the vehicle, comprising,
        a second shaft extending laterally from a second frontside of the vehicle that is generally opposite from the first front side;
        a second elongated arm coupled to an end of the second shaft opposite to the vehicle;
        at least one second wheel coupled to the second elongated arm in a position capable of contacting a ground surface; and
        a second blade rotatably coupled to the second elongated arm proximate to the at least one second wheel; and
    a safety mechanism coupled to the first blade of the first edging assembly such that the first blade is prevented from rotating when the first wheel is not in contact with a surface, and the first blade rotates when the first wheel is in contact with the surface.

11. The lawn cutting assembly of claim 10, wherein the safety mechanism comprises an engagement sheath movably positioned along the first elongated arm so that the engagement sheath is adapted to engage an operation lever and speed lever.

12. The lawn cutting assembly of claim 10, wherein the first and second shafts are movably attached to the vehicle.

13. The lawn cutting assembly of claim 10, further a blower configured to blow gases toward the first edging assembly to blow debris from a surface proximate to the assembly.

14. The lawn cutting assembly of claim 10, further comprising a suction device configured to blow gases toward the first edging assembly to blow debris from a surface proximate to the assembly.

15. The lawn cutting assembly of claim 10, wherein the first and second edging assemblies are adjustable independently of the other.

16. The lawn cutting assembly of claim 10, wherein the first and second edging assemblies are laterally adjustable and form a parallelogram permitting independent change of direction of the first and second edging assemblies during movement of the vehicle.

17. The law cutting assembly of claim 10, wherein the biased link forces rapid movement of the mechanical image.

18. The lawn cutting assembly of claim 17, wherein the biased link is greater in length than the transfer link.

19. The lawn cutting assembly of claim 10, further comprising a spring positioned concentrically on the protecting arm and within a cylindrical housing.

20. The lawn cutting assembly of claim 10, further comprising a protection assembly extending beyond the first blade in the first edging assembly to contact an object before the first blade makes contact with the object, wherein the protection assembly comprises a protecting arm slidably attached to a cutting blade housing member surrounding the first blade, a transfer link extending between the cutting blade housing member and the first wheel, and a biased link attached to an end of the transfer link and attached to the cutting blade housing member such that as the protecting arm slides generally along its longitudinal axis when contacting the object, the protecting arm contacts the transfer link and causes the transfer link to rotate the first blade and cutting blade housing member about the first blade such that the first blade is out of contact with the ground surface.

\* \* \* \* \*

UNITED STATES PATENT AND TRADEMARK OFFICE
CERTIFICATE OF CORRECTION

| | | |
|---|---|---|
| PATENT NO. | : 7,059,107 B2 | |
| APPLICATION NO. | : 10/910438 | |
| DATED | : June 13, 2006 | |
| INVENTOR(S) | : Pulvirenti, Vincent | |

It is certified that error appears in the above-identified patent and that said Letters Patent is hereby corrected as shown below:

In the claims

Claim 9, column 8, line 32, replace "8" with --1--.
Claim 17, column 9, line 23, replace "image" with --linkage--

Signed and Sealed this

Twenty-ninth Day of August, 2006

JON W. DUDAS
*Director of the United States Patent and Trademark Office*